United States Patent
Kulkarni et al.

(10) Patent No.: US 12,490,076 B2
(45) Date of Patent: Dec. 2, 2025

(54) NETWORK ASSISTED ROAMING FOR MULTILINK CLIENTS

(71) Applicant: Cisco Technology, Inc., San Jose, CA (US)

(72) Inventors: Santosh B. Kulkarni, Sunnyvale, CA (US); Vishal S. Desai, San Jose, CA (US); Pooya Monajemi, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 319 days.

(21) Appl. No.: 18/319,967

(22) Filed: May 18, 2023

(65) Prior Publication Data

US 2024/0388886 A1    Nov. 21, 2024

(51) Int. Cl.
  *H04W 8/12* (2009.01)
  *H04W 36/08* (2009.01)
  *H04W 88/06* (2009.01)

(52) U.S. Cl.
  CPC ............. *H04W 8/12* (2013.01); *H04W 36/08* (2013.01); *H04W 88/06* (2013.01)

(58) Field of Classification Search
  CPC ....... H04W 8/12; H04W 36/08; H04W 88/06; H04W 36/302; H04W 36/00692; H04W 76/15; H04W 76/20; H04W 84/12; H04L 5/0035
  See application file for complete search history.

(56) References Cited

U.S. PATENT DOCUMENTS

| | | | |
|---|---|---|---|
| 2012/0127876 A1* | 5/2012 | Hunukumbure | H04W 24/00 370/252 |
| 2020/0128435 A1* | 4/2020 | Li | H04W 76/15 |
| 2020/0221545 A1* | 7/2020 | Stacey | H04W 84/12 |
| 2021/0007168 A1* | 1/2021 | Asterjadhi | H04W 52/0235 |
| 2021/0076413 A1 | 3/2021 | Lu et al. | |

(Continued)

FOREIGN PATENT DOCUMENTS

| | | | | |
|---|---|---|---|---|
| CN | 113039857 B | * | 3/2024 | ........ H04W 36/0033 |
| WO | 2021183045 A1 | | 9/2021 | |
| WO | WO-2023070092 A1 | * | 4/2023 | ............ H04W 36/02 |

OTHER PUBLICATIONS

Laurent Cariou, "IEEE P802.11 Wireless LANs: MLO TID-link-mapping/link management: Default mode and link enablement," IEEE 802.11-18/0149r00, Date: Jul. 2020, pp. 1-4.

(Continued)

*Primary Examiner* — Julio R Perez (74) *Attorney, Agent, or Firm* — Patterson + Sheridan, LLP (57) ABSTRACT

Disclosed herein is an MLD AP that attempts to avoid roaming of STAs within its coverage area when one of the links of the STA is about fall out of the coverage area of the MLD AP. When the MLD STA moves in a way that puts one of its links on the verge of a coverage area, its servicing MLD AP attempts to reroute traffic to other in-range links of the STA if a TID-to-link mapping is in place that permits the rerouting. If no such TID-to-link mapping is present, then the MLD AP attempts to reassign traffic to one of the in-range links if one of the links has an acceptable quality of service and can handle the traffic on the out-of-range link. If these attempts fail, then the AP causes the MLD STA to roam to a nearby MLD AP.

20 Claims, 12 Drawing Sheets

(56) References Cited

U.S. PATENT DOCUMENTS

| | | | |
|---|---|---|---|
| 2021/0282047 A1* | 9/2021 | Cherian | H04W 80/02 |
| 2021/0298102 A1* | 9/2021 | Kwon | H04W 48/08 |
| 2021/0321243 A1* | 10/2021 | Patil | H04W 8/005 |
| 2021/0385692 A1* | 12/2021 | Kwon | H04W 28/24 |
| 2022/0124855 A1* | 4/2022 | Hu | H04W 76/34 |
| 2022/0225200 A1* | 7/2022 | Smith | H04L 1/1614 |
| 2022/0322145 A1 | 10/2022 | Monajemi et al. | |
| 2022/0322162 A1 | 10/2022 | Wu et al. | |
| 2022/0345973 A1* | 10/2022 | Sun | H04W 74/0816 |
| 2023/0053972 A1* | 2/2023 | Patil | H04W 76/15 |
| 2023/0054755 A1* | 2/2023 | Patil | H04W 76/15 |
| 2023/0199551 A1* | 6/2023 | Kim | H04W 28/082 |
| | | | 370/229 |
| 2023/0232276 A1* | 7/2023 | Chitrakar | H04W 28/0278 |
| 2023/0247474 A1* | 8/2023 | Liu | H04W 72/20 |
| | | | 370/329 |
| 2023/0247698 A1* | 8/2023 | Liu | H04W 72/543 |
| | | | 370/329 |
| 2023/0308938 A1* | 9/2023 | Sun | H04W 76/20 |
| 2023/0308965 A1* | 9/2023 | Marupaduga | H04W 36/0083 |
| 2024/0056875 A1* | 2/2024 | Choi | H04W 28/0268 |
| 2024/0251282 A1* | 7/2024 | Kim | H04W 74/08 |
| 2025/0211368 A1* | 6/2025 | Smith | H04W 36/22 |

OTHER PUBLICATIONS

Yongho Seok et al., "IEEE P802.11 Wireless LANs: Proposed Draft Text for MLO TID-to-link Mapping," IEEE 802.11-21/0019r5, Dated: Mar. 25, 2021, pp. 1-10.

Alvaro Lopez-Raventos et al., "IEEE 802.11be Multi-Link Operation: When the Best Could Be to Use Only a Single Interface," arXiv.org, Dated: May 21, 2021, pp. 1-7.

Alvaro Lopez-Raventos et al., "Multi-link Operation in IEEE 802.11be WLANs," arXiv.org, Dated: Jan. 19, 2022, pp. 1-7.

"IEEE P802.11be™/D1.4: Draft Standard for Information Technology—Telecommunications and information exchange between systems Local and metroplitan area networks—Specific Requirements: Part 11: Wireless LAN Medium Access Control (MAC) and Physical Layer (PHY) Specifications: Amendment 8: Enhancements for extremely high throughput (EHT)," LAN/MAN Standards Committee of the IEEE Computer Society, Dated: Jan. 2022, pp. 1-787.

"Traffic Identifier," Wikipedia, Date Accessed: Feb. 14, 2023, pp. 1.

International Search Report and Written Opinion for International Application No. PCT/US2024/028191, mailed Aug. 6, 2024, 16 Pages.

* cited by examiner

NETWORK ASSISTED ROAMING FOR MULTILINK CLIENTS

TECHNICAL FIELD

Embodiments presented in this disclosure generally relate to multilink devices in a wireless network. More specifically, embodiments disclosed herein relate to the assignment of traffic to active radio links.

BACKGROUND

Figure 1A:
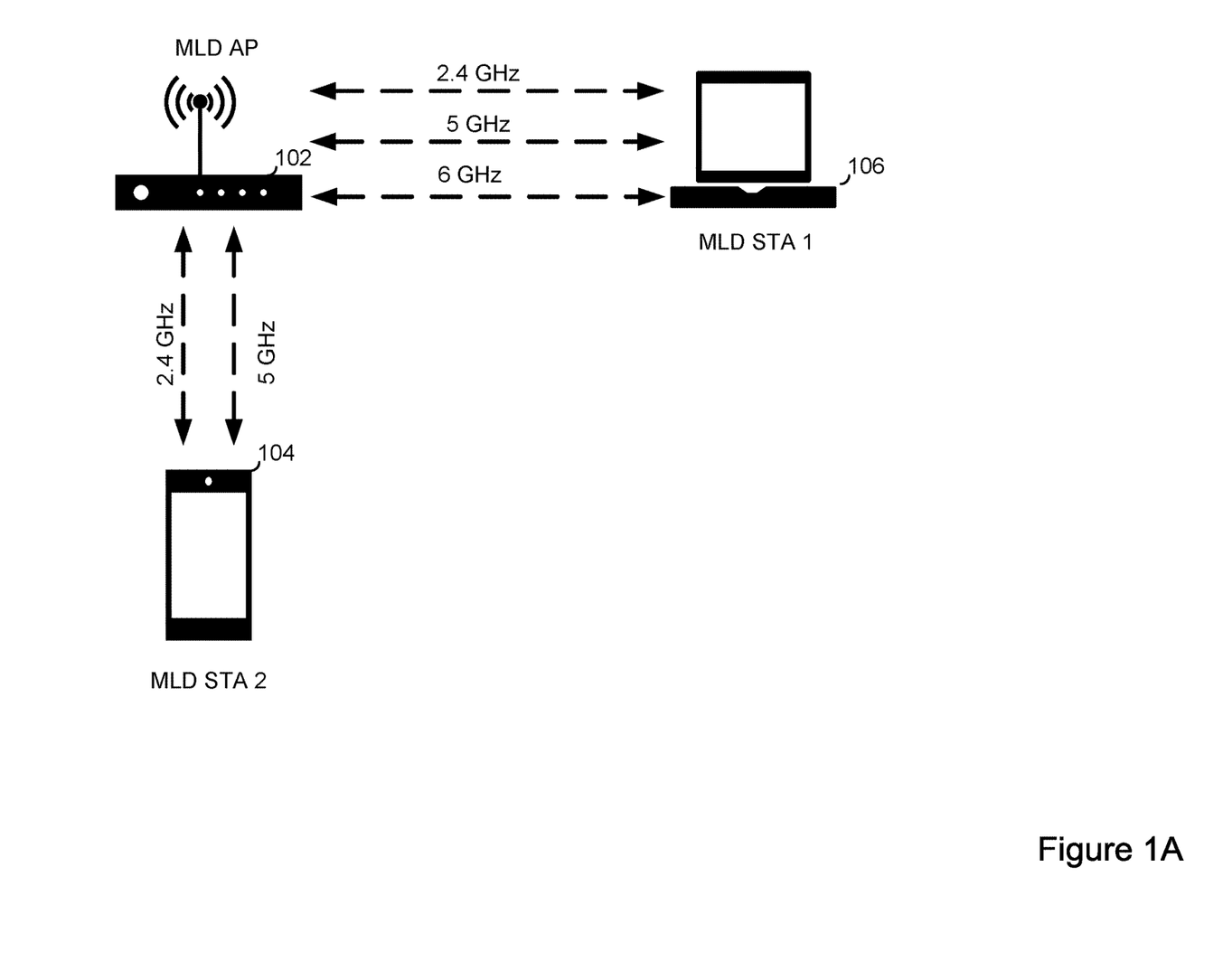
FIG. 1A depicts a Multilink AP with multilink STAs, according to one embodiment.

One of the main objectives of the 802.11be standard is to make efficient use of multiple bands and channels therein. Towards this end, 802.11be introduces the concept of multilink devices (MLDs), which allows capable stations (STAs) to be simultaneously associated with multiple radios on an access point (AP), as illustrated in FIG. 1 below. Although they have multiple links, an MLD STA is associated with no more than one AP MLD at any given instant. This association allows the infrastructure to determine unique answers to questions like "Which AP MLD is serving MLD STAX?" When an MLD STA moves, it must migrate all of its links from its current serving AP to the next AP.

WLAN infrastructure has long assisted mobile STAs in roaming, typically by providing them with a list of candidate APs to which the STA could potentially roam. Such assistance helps reduce client power consumption, speed up the search for the next AP, and improve overall air time efficiency. These methods, however, do not consider the presence of multiple links on the roaming STA and its serving AP. They assume a single link of operation between the STA and the AP and trigger a roam request as soon as the link is on the verge of going out of the AP's coverage range.

Triggering a roam request can lead to undesirable outcomes, such as possible disruption in connectivity during the roaming even though one or more of its links are still within the coverage area of its serving AP.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method for reducing roaming for multilink devices. The method includes establishing, using multiple radio links in an access point, multiple radio links with a multilink device, determining that one of the multiple radio links is a non-viable link, where the non-viable link is at a coverage edge of or is losing connectivity to the access point. The method further includes, if traffic on the non-viable link is currently assigned to another link of the multiple radio links and the other link is in range, disassociating from the access point the non-viable link of the multilink device.

Another embodiment presented in this disclosure is an access point for reducing roaming for multilink devices. The access point includes multiple radio links, a processor, and a memory coupled to the processor, wherein the memory has loaded therein an application, which, when executed by the processor, configures the access point to: establish, using multiple radio links, in an access point, multiple links with a multilink device; determine that one of the multiple radio links is a non-viable link, where the non-viable link is at a coverage edge of or is losing connectivity to the access point; and if traffic on the non-viable link is currently assigned to another link of the multiple radio links and the other link is in range, disassociate from the access point the non-viable link of the multilink device.

Yet another embodiment presented in this disclosure is a non-transitory computer-readable medium encoding instructions, which, when executed by a processor of an access point coupled to a wireless medium, cause the access point to: establish, using multiple radio links, in an access point, multiple links with a multilink device; determine that one of the multiple radio links is a non-viable link, where the non-viable link is at a coverage edge of or is losing connectivity to the access point; and if traffic on the non-viable link is currently assigned to another link of the multiple radio links and the other link is in range, disassociate from the access point the non-viable link of the multilink device.

Example Embodiments

A WLAN infrastructure-provided roaming assistance scheme is described herein. The WLAN infrastructure avoids initiating roam requests for MLD STAs if the STA is still within the coverage area of the serving AP on other link(s). Instead, the WLAN infrastructure tries tore-negotiate TIDs mapped to the link in danger of going out of coverage range to other links on the same MLD STA that are still within the coverage range of the serving AP.

With the introduction of MLDs in 802.11be, an MLD STA can simultaneously be associated with multiple radios on an MLD AP. Simultaneous transmit and receive operations on multiple links allow MLD STAs to greatly increase their capacity and achieve higher throughputs.

One of the key features of Multilink operation is a traffic identifier (TID)-to-link mapping. The TID-to-link mapping mechanism allows an MLD STA and its serving MLD AP to determine how uplink (UL) and downlink (DL) traffic corresponding to TID values between 0 and 7 are assigned to their associated links. A TID traffic type can be mapped to a link set, which is a subset of setup links spanning from only one setup link to all setup links between an MLD STA and its corresponding MLD AP, where a setup link is one that is enabled for a non-AP MLD if at least one TID is mapped to that link either in a DL or a UL and is disabled if no TIDs are mapped to that link in both in the DL and UL. By default, all setup links are enabled. Thus, TIDs provide a way to organize traffic types among the enabled links of multilink devices.

FIG. 1A depicts a Multilink AP with multilink STAs. MLD AP 102 has a 2.4 GHz link and a 5 GHz link with MLD STA 2 104. Also, MLD AP 102 has a 2.4 GHz link, a 5 GHz link, and a 6 GHz link with MLD STA 1 106. An MLD STA, such as MLD STA 2 104, may move with respect to MLD AP 102, thereby connecting or disconnecting one or more of its links with the MLD AP 102.

Figure 1B:
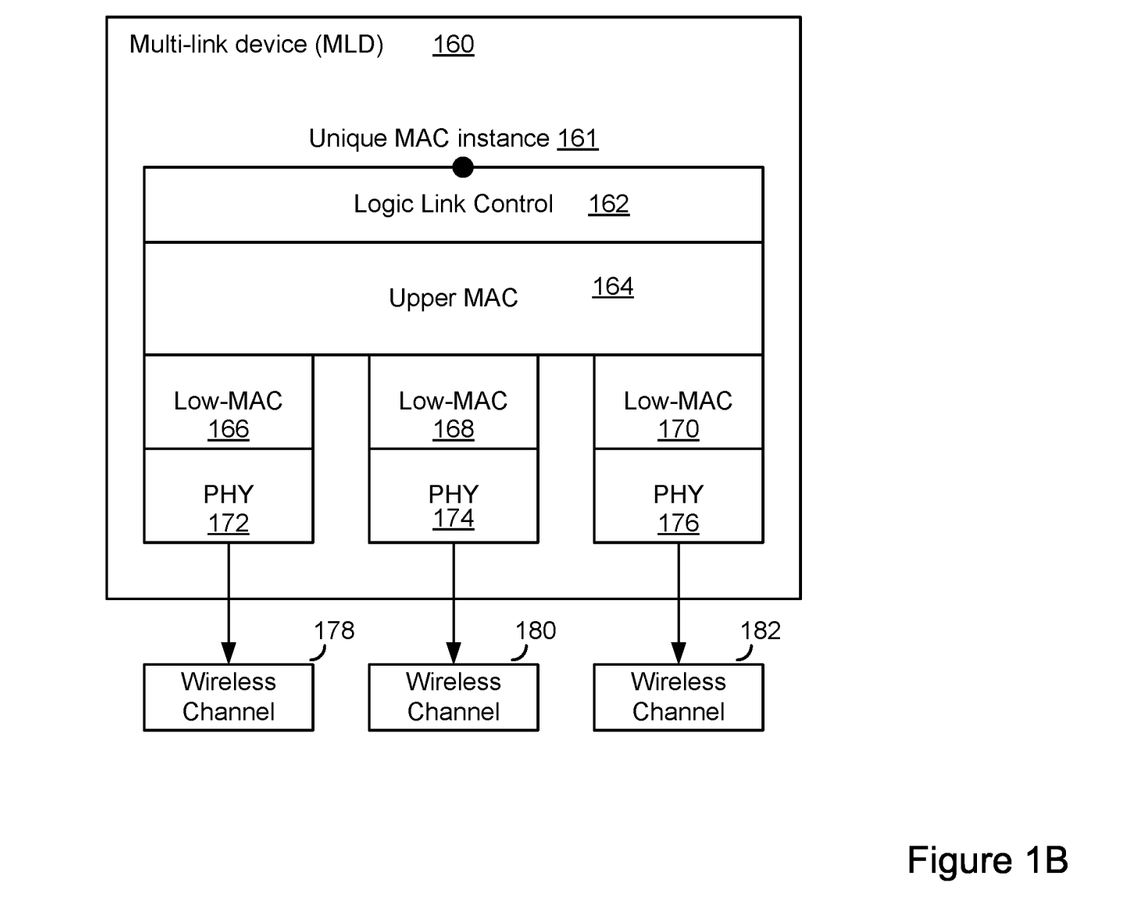
FIG. 1B depicts a representative structure of an MLD, according to one embodiment.

FIG. 1B depicts a representative architecture of an MLD. An AP MLD or an MLD STA refers to a single device with multiple wireless interfaces. MLDs provide a unique MAC instance 161, derived from a Logical Link Control layer 162, to the upper layers without losing the independent parameters of each interface. To achieve this, the MAC sub-layer is split into two levels. The upper MAC (U-MAC) layer 164 is a common part of the MAC sub-layer for all the interfaces. The U-MAC layer assigns sequence numbers and provides aggregation/de-aggregation to MAC service data units (MSDUs). Below the U-MAC layer are the low MAC (L-MAC) layers 166, 168, 170, which are independent for each physical interface PHY (172, 174, 176), which in turn is coupled respectively to wireless channels 178, 180, 182. The L-MAC layer 166, 168, 170 takes care of link-specific functions like channel access and may keep its own channel parameters. The L-MAC layer 166, 168, 170 also generates management and control frames and creates MAC headers and validation when transmitting and receiving, respectively. Thus, an MLD device 160 can move traffic from one link to another without involving the upper layers.

Figure 2:
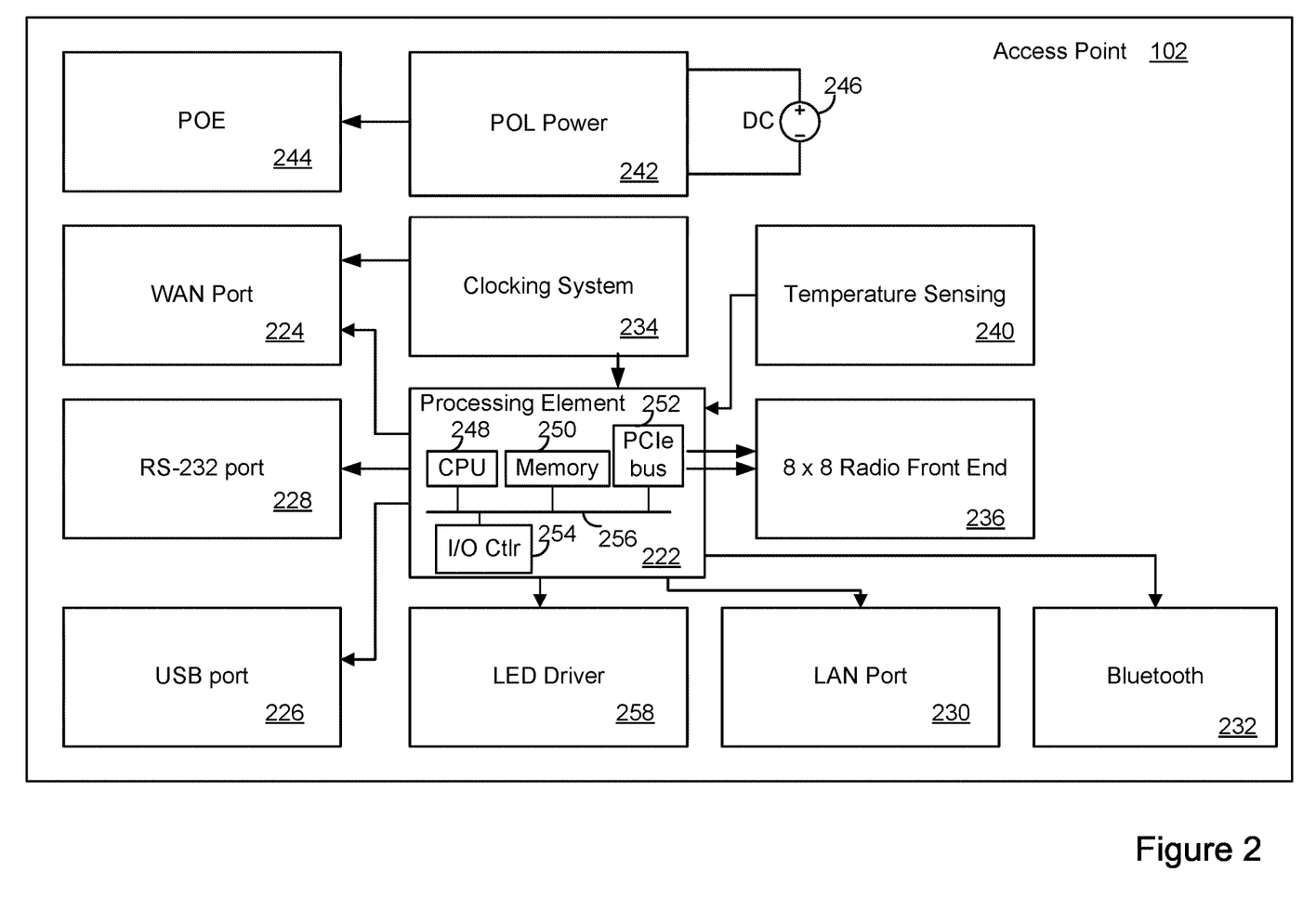
FIG. 2 depicts a representative design of an access point, according to one embodiment.

FIG. 2 depicts a representative design of an MLD AP. The MLD AP 102 includes a processing element 222 and several ports or connection facilities, such as a WAN port 224, USB port 226, RS-232 port 228, LAN port 230, and Bluetooth 232. Also included are a clocking system 234 and an 8×8 radio front-end 236 with a transmitter and receiver, which are coupled to eight external antennas. Auxiliary modules include a temperature sensing module 240, a power module 242 connected to a DC power source 246, a power over Ethernet (POE) module 244, and LED driver 258. Processing element 222 includes a CPU 248 and memory 250, a peripheral control interconnect express (PCIe) bus controller 252 for connecting to the radio front end 236, and an I/O controller 254, all coupled to each other via bus 256.

Figure 3:
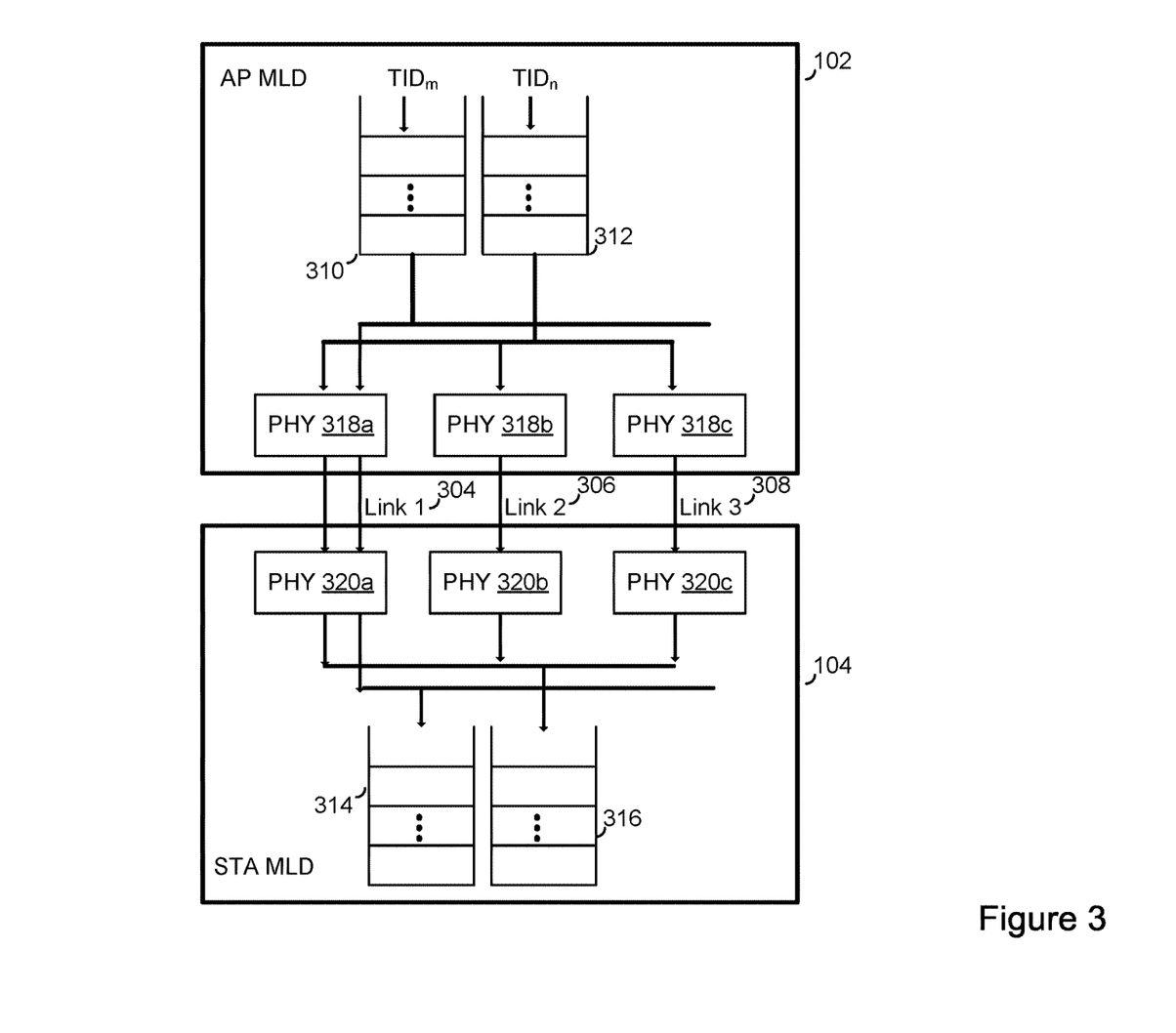
FIG. 3 depicts TID-to-link mapping between an MLD AP and an MLD STA, according to one embodiment.

FIG. 3 depicts TID-to-link mapping between an MLD AP and an MLD STA. An example of DL TID-to-link mapping between MLD AP 102 and MLD STA 104 is depicted. The figure shows MLD AP 102 has TIDn-type traffic flow through queue 312 to the physical layer (PHY) 318a, PHY 318b, PHY 318c, and link 1 304, link 2 306, and link 3 308, respectively. The TIDn-type traffic then flows over PHY 320a, PHY 320b, and PHY 320c to queue 316 in STA MLD 104. In addition, the MLD AP 102 has TIDm-type traffic flow through queue 310 over PHY 318a, link 1 304, PHY 320a, and to MLD STA queue 314. Thus, traffic types TIDn and TIDm share a link (link 1 304) but flow in separate queues. An MLD STA or MLD AP can also suggest their preferred TID-to-link mapping and further re-negotiate their already negotiated TID-to-link mapping if needed.

Figure 4:
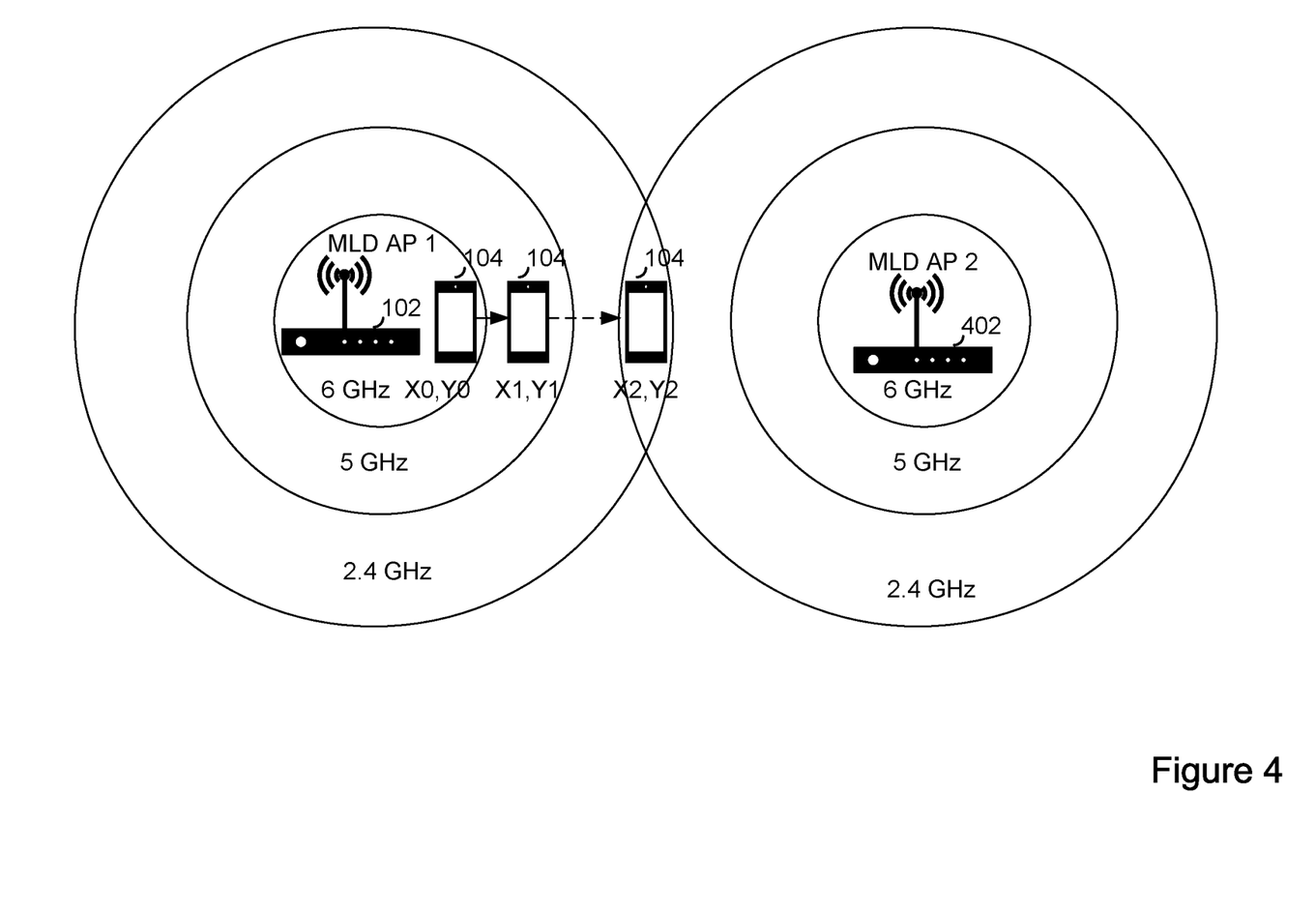
FIG. 4 depicts an STA roaming away from a first MLD AP towards a second MLD AP, according to one embodiment.

FIG. 4 depicts an STA roaming away from a first MLD AP towards a second MLD AP. An MLD STA 104 is associated with MLD AP1 102 but is moving towards MLD AP2 402. At position (X0, Y0), all three links are associated with MLD AP1. As it moves towards location (X1, Y1), it will be out of range of AP1's 6 GHz radio. Being out of range would typically cause MLD AP1 to trigger a roam event on a 6 GHz link, suggesting that MLD STA 104 roam to a nearby AP even though it is still connected on 5 GHz and 2.4 GHz links. And since an MLD STA 104 can be associated with only a single MLD AP (say AP 102) at any given instant, the roam suggestion causes the MLD STA 104 to tear down (disassociate) and roam all its links to one of the suggested neighbors, potentially resulting in service disruption.

Figure 5A:
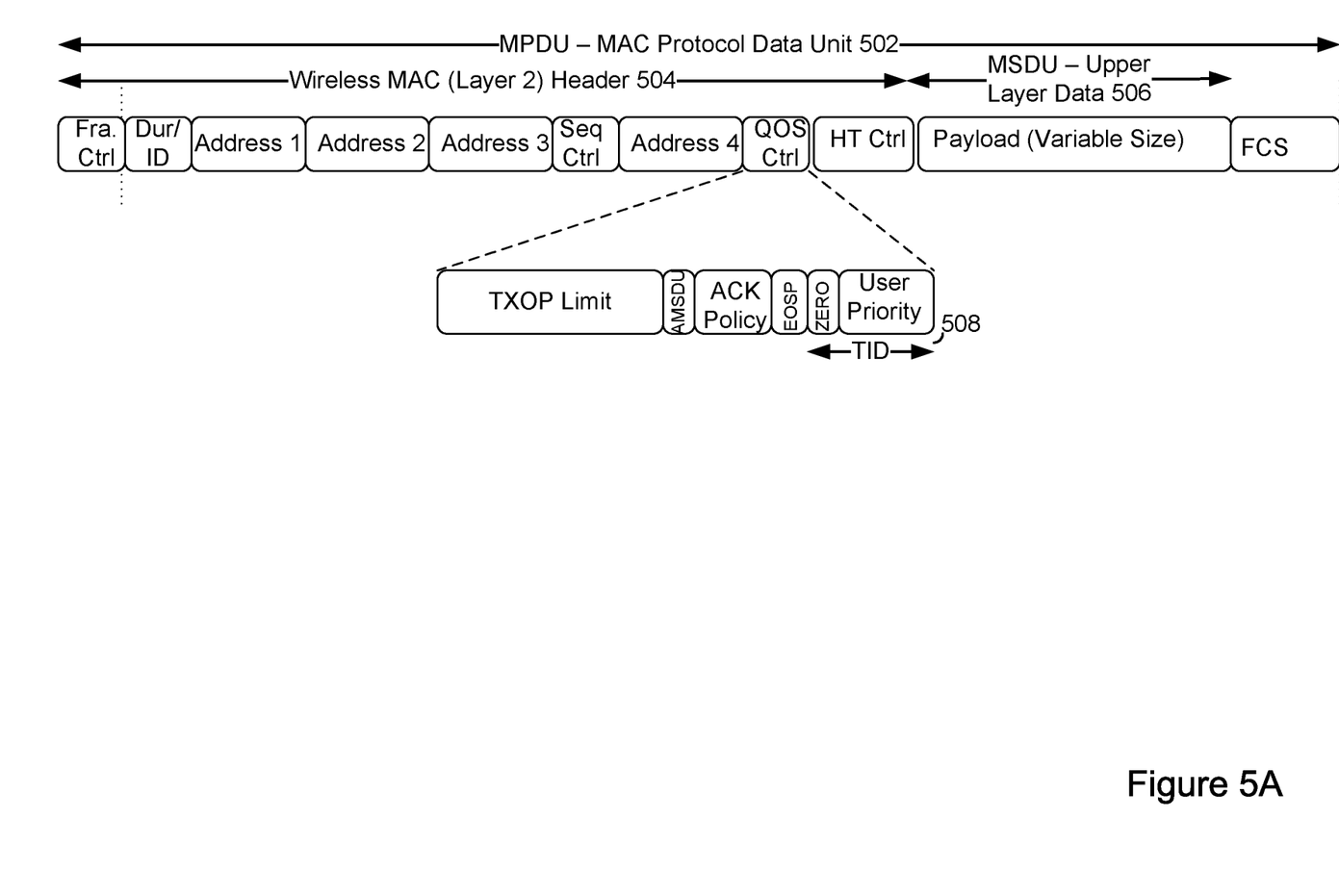
FIG. 5A depicts a MAC Protocol data unit (MPDU) that includes a field for identifying a traffic type, according to one embodiment.
Figure 5B:
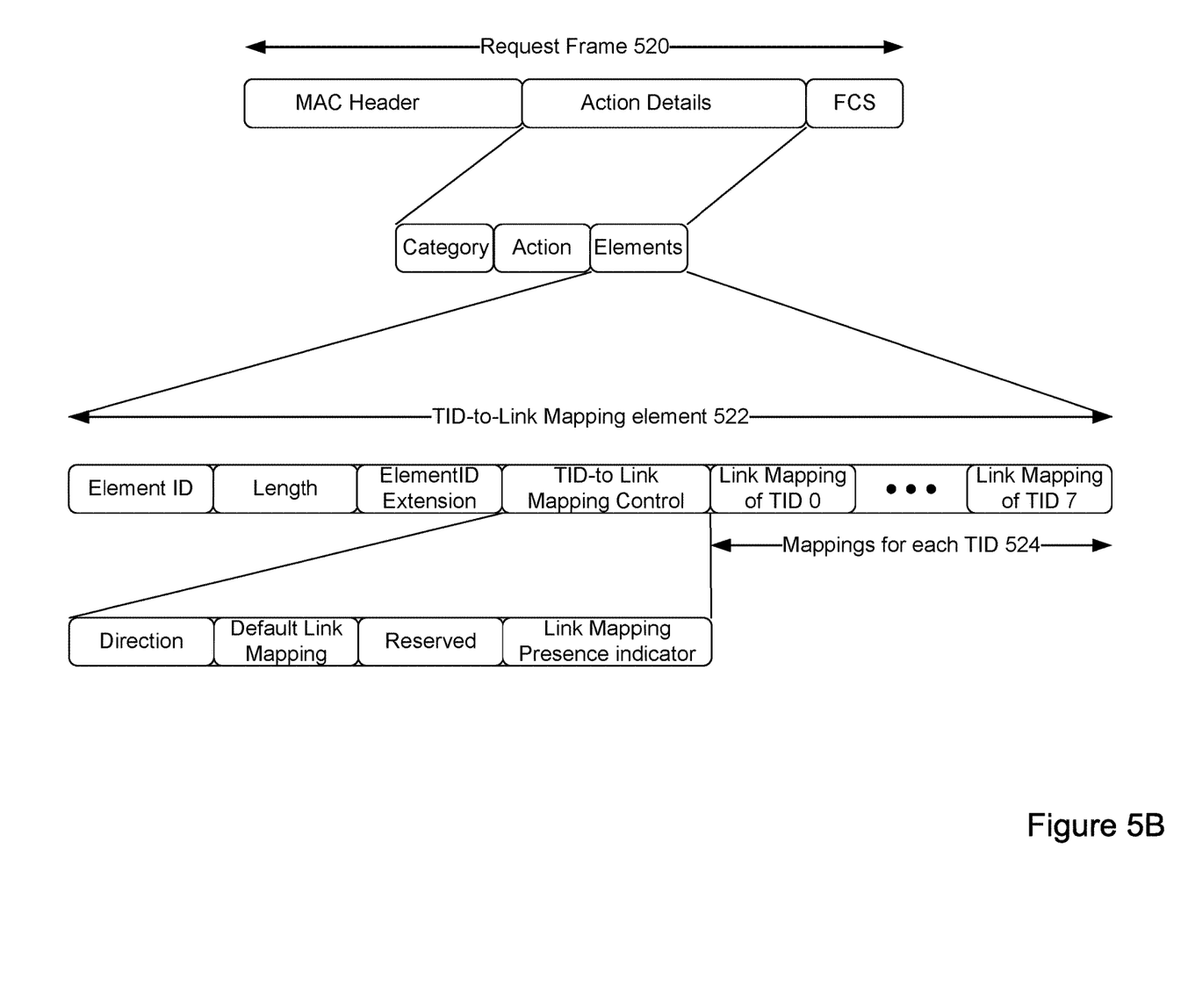
FIG. 5B depicts a request frame for modifying TID-to-link mapping, according to one embodiment.
Figure 5C:
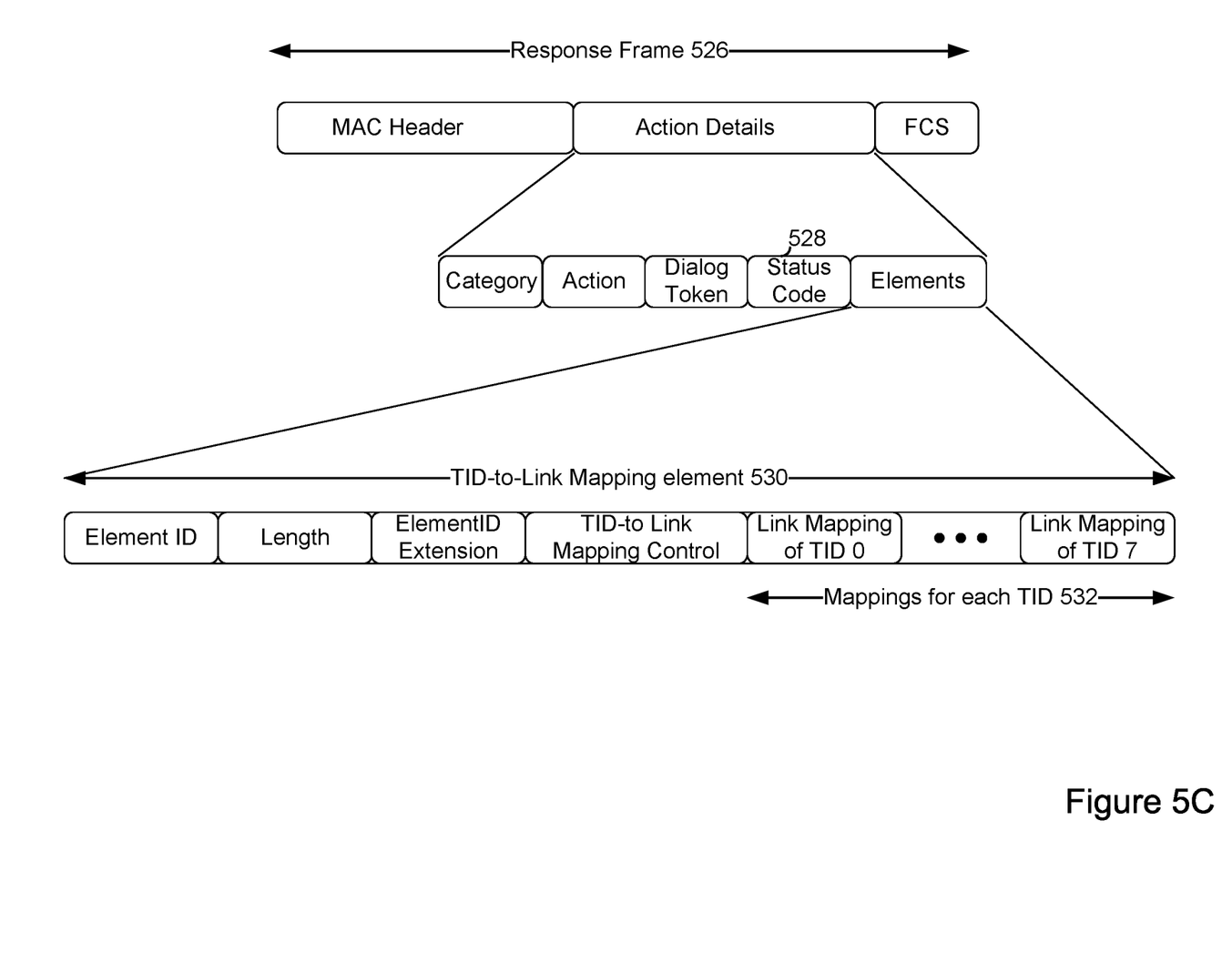
FIG. 5C depicts a response frame for responding to the request frame, according to one embodiment.

FIGS. 5A-5C depict link-level frames for identifying a quality of service associated with a traffic type and frames for negotiating TID-to-Link mappings.

FIG. 5A depicts an MPDU 502 with a field for identifying a traffic type. The MPDU includes a MAC header 504 and a data 506. The MAC header 504 includes a quality of service (QOS) field, which includes TID field 508. The TID field 508 includes a user priority field that identifies the traffic type. The user priority field values range from 0 to 7, with each priority number defining an access category. Priorities 1 and 2 are assigned to background activity (i.e., background or non-time-sensitive traffic). Priorities 0 and 3 are assigned to best-effort traffic. Priorities 4 and 5 are assigned to video traffic, and priorities 6 and 7 are assigned to voice traffic. Thus, the user priority numbers refer to a category of traffic.

In addition, a TID-to-link mapping element can be used in a (Re)Association request frame sent by the MLD to negotiate a mapping with another MLD. This mapping element determines the assignment of traffic categories to active links of the AP MLD and non-AP MLD. By default, all TIDs are mapped to all of the links. An MLD receiving a TID-to-link mapping can respond with a response frame indicating whether it accepts or rejects the requested mapping.

FIG. 5B depicts a request frame that includes a TID-to-Link Mapping element 522 in its elements field. TID-to-Link Mapping element 522 includes a TID-to-Link Mapping control field and optional link mappings 524 of TID numbers 0-7.

The control field includes a direction, a default link mapping, a link mapping size, and a link mapping presence indicator.

The Direction field is set to 0 (Downlink) if the TID-to-Link Mapping element provides the link mapping information for the downlink frame. In one embodiment, it is set to 1 (Uplink) if the TID-to-Link Mapping element provides the link mapping information for the uplink frame. It is set to 2 (Bidirectional link) if the TID-to-Link Mapping element provides the link mapping information for both the uplink and downlink frames. In one embodiment, the value of 3 is reserved.

The Default Link Mapping field is set to 1 if the TID-to-Link Mapping element represents the default link mapping. Otherwise, it is set to 0.

The Link Mapping Size field indicates the size of the Link Mapping of the TID n field.

The Link Mapping Presence Indicator field represents which the Link Mapping of TID n field is present in the TID-to-Link Mapping element. A value of 1 in bit position n of the Link Mapping Presence Indicator field means that the Link Mapping Of TID n field is present in the TID-to-Link Mapping element. Otherwise, the Link Mapping Of TID n field is not present in the TID-to-Link Mapping element. When the Default Link Mapping field is set to 1, this field is reserved.

The Link Mapping 524 of TID n field (where n=0-7) indicates the links on which frames belonging to the TID n are sent. A value of 1 in bit position i of the Link Mapping of TID n field means that the link associated with the link ID i is used for exchanging frames belonging to the TID n.

FIG. 5C depicts a response frame. The response frame 526 is similar to the request frame 520 but contains a status code 528. Status code 528 is capable of indicating whether the TID-to-Link Element is a preferred mapping or not.

Figure 6A:
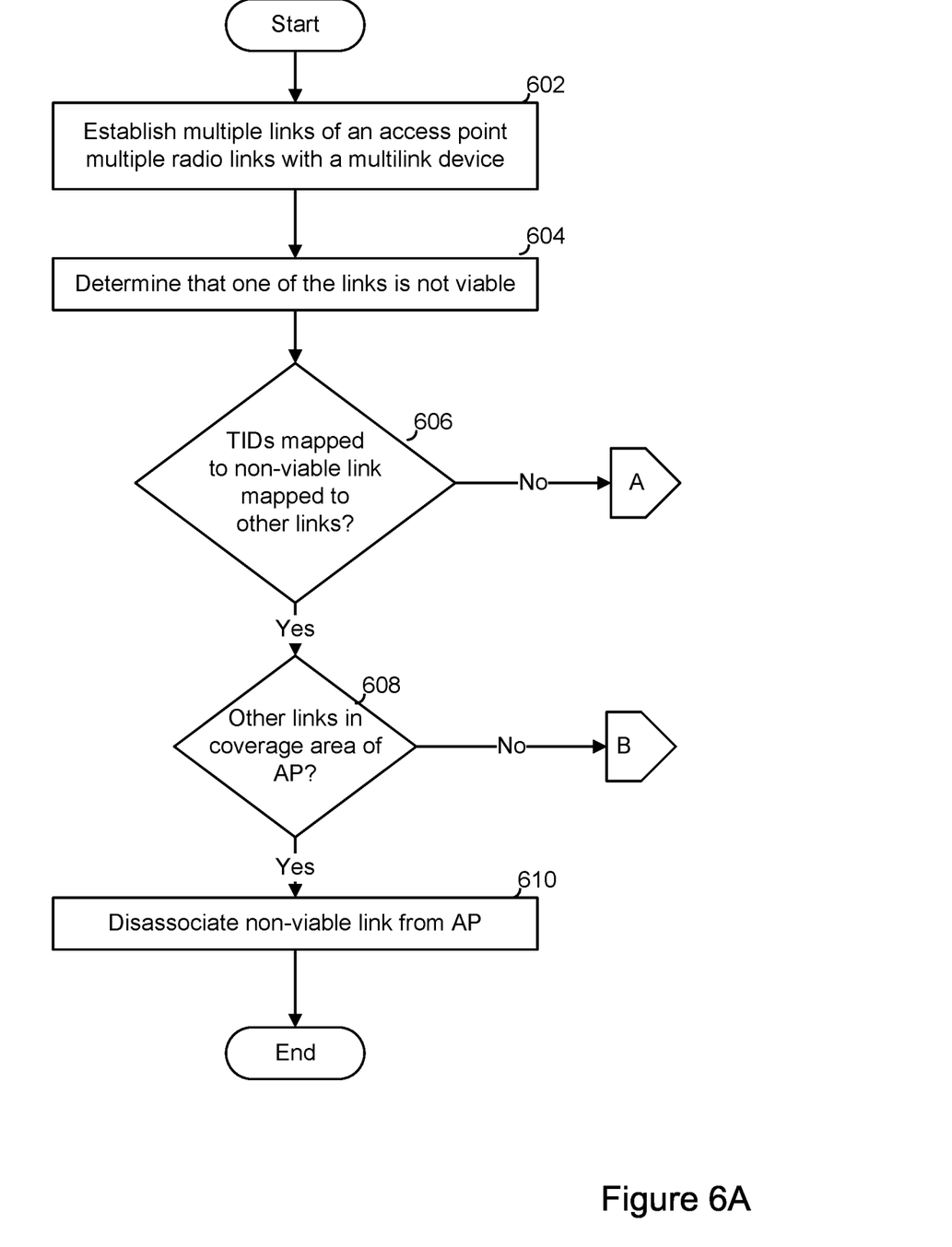
FIGS. 6A-6D depict a flow of operations for reducing roaming, in an embodiment.
Figure 6B:
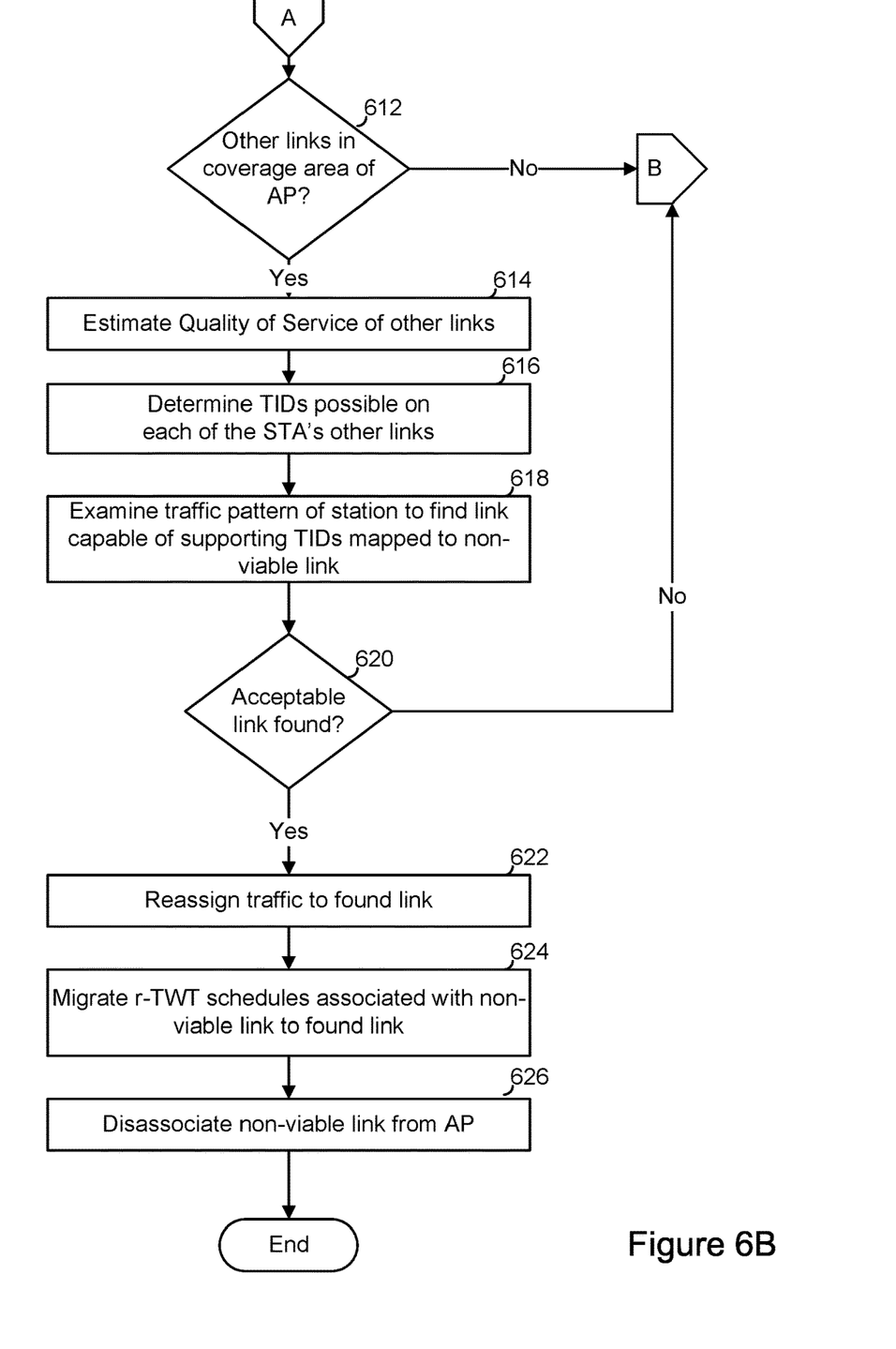
Figure 6C:
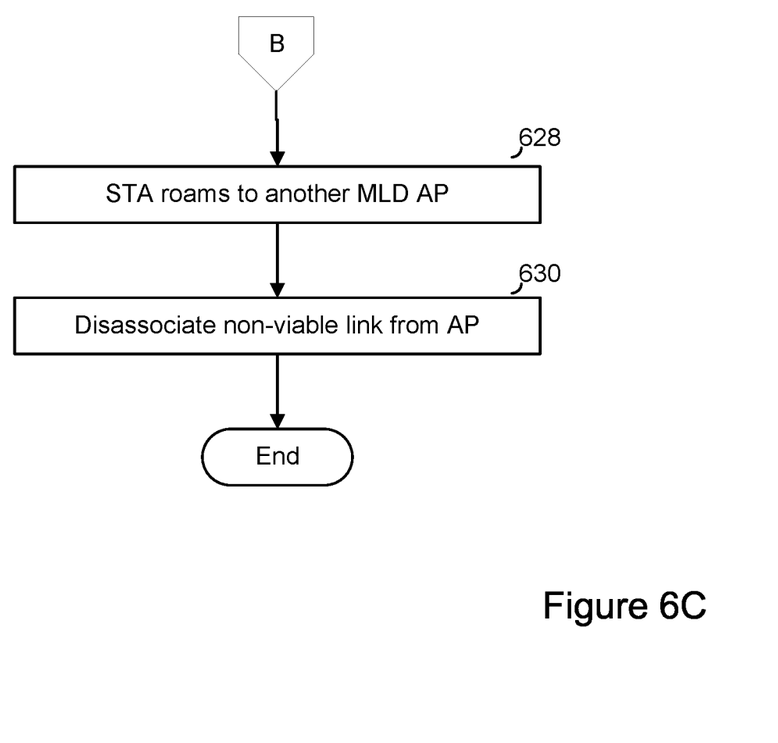

FIGS. 6A-6C depict a flow of operations for reducing roaming. FIG. 6A depicts the case in which TIDs which are mapped to the non-viable link are mapped to other active links. FIG. 6B depicts the case in which TIDs are not mapped to the non-viable link, but a link with a suitable quality of service can handle the traffic of the non-viable link. FIG. 6C depicts the case in which no link is in range or if a link is in range, it cannot handle the traffic of the non-viable link.

FIG. 6A depicts a flow of operations for reducing roaming, in an embodiment. In block 602, a multilink device (e.g., an MLD STA) establishes multiple radio links with an MLD access point. In block 604, the access point determines that one of the links is non-viable, wherein a non-viable link is a link that is on the coverage edge and on the verge of losing connectivity with the MLD AP. Being on the coverage edge may be due to a non-AP MLD moving away from the MLD AP.

In block 606, the AP determines whether all TIDs mapped to the non-viable link are also mapped to other links. For example, if link 2 306 in FIG. 3, to which TIDn type traffic is mapped, becomes a non-viable link, the same type of traffic is also mapped to other links 1 and 3. If so, in block 608, the AP determines whether any of those links are still within the coverage area of the MLD AP. In the above example, links 1 and 3 may still be in the coverage area. If so, then in block 610, the non-viable link can be torn down (i.e., disassociated from the AP) because other links on the MLD STA can support the client's QoS needs. Additionally, the proposed TID-to-link re-mapping can also happen when the MLD STA is moving towards the MLD AP. A disassociated link moving towards its servicing MLD AP is described in reference to FIG. 6D.

If, as determined in block 606, there are no TIDs mapped to the non-viable link that are mapped to other links, then flow proceeds to block 612 of FIG. 6B, in which the AP determines whether other links of the MLD STA are still within the MLD AP coverage area. If so, in block 614, the QoS is estimated.

In block 616, the TIDs possible on each of the MLD STA's other links are determined. Determining the possible TIDs on the other links can be done using metrics like the Received Signal Strength Indicator (RSSI) and the Packet Delivery Ratio, the ratio of packets successfully received to the total number of packets sent by a sender.

In block 618, The MLD AP also evaluates the MLD STA's traffic pattern to determine acceptable links on the MLD STA, which are links capable of supporting TIDs that are mapped to the non-viable link. A link capable of supporting a TID type of traffic is one that has sufficient throughput and low latency for the traffic type.

If acceptable links exist, as determined in block 620, then in block 622, the MLD AP reassigns traffic to the acceptable links found in block 620. Traffic originating from many real-time applications has strict latency requirements. Restricted target wake time (r-TWT) scheduling AP or r-TWT scheduled STA ensures that latency-sensitive traffic is prioritized. In block 624, the AP migrates any established r-TWT schedules associated with the non-viable link to the identified acceptable viable links so that the acceptable links are subject to the schedules of the non-viable link.

In block 626, the non-viable MLD STA link can be torn down (disassociated from the MLD AP). Tearing down a mapping is performed by a TID-to-Link Mapping teardown frame which contains a teardown action. After the MLD STA establishes new links with the MLD AP, the AP can initiate a TLD-to-link re-mapping in order to increase channel access opportunities for latency-sensitive flows.

If the AP determines in blocks 608 or 612 that there are no other links in the coverage area of the AP or in block 620 if there are links in the coverage area but no acceptable link can be found, flow proceeds to block 628 of FIG. 6C. In block 628, the STA roams to another MLD AP. In one embodiment, the AP can guide the STA to roam to a link of another MLD AP via an 802.11k neighbor list or 802.11v BSS transition message. In another embodiment, the AP can force the STA to roam to a link of another MLD AP by suppressing authorization of the link with the current MLD AP. In block 630, the MLD AP disassociates the non-viable link from the MLD AP. Referring again to FIG. 4, when the MLD STA is at location (X2, Y2) and is moving away from MLD AP1 and there is no viable link, the MLD AP1 guides or forces the MLD STA to roam, causing the STA to reassociate with MLD AP 2.

Figure 6D:
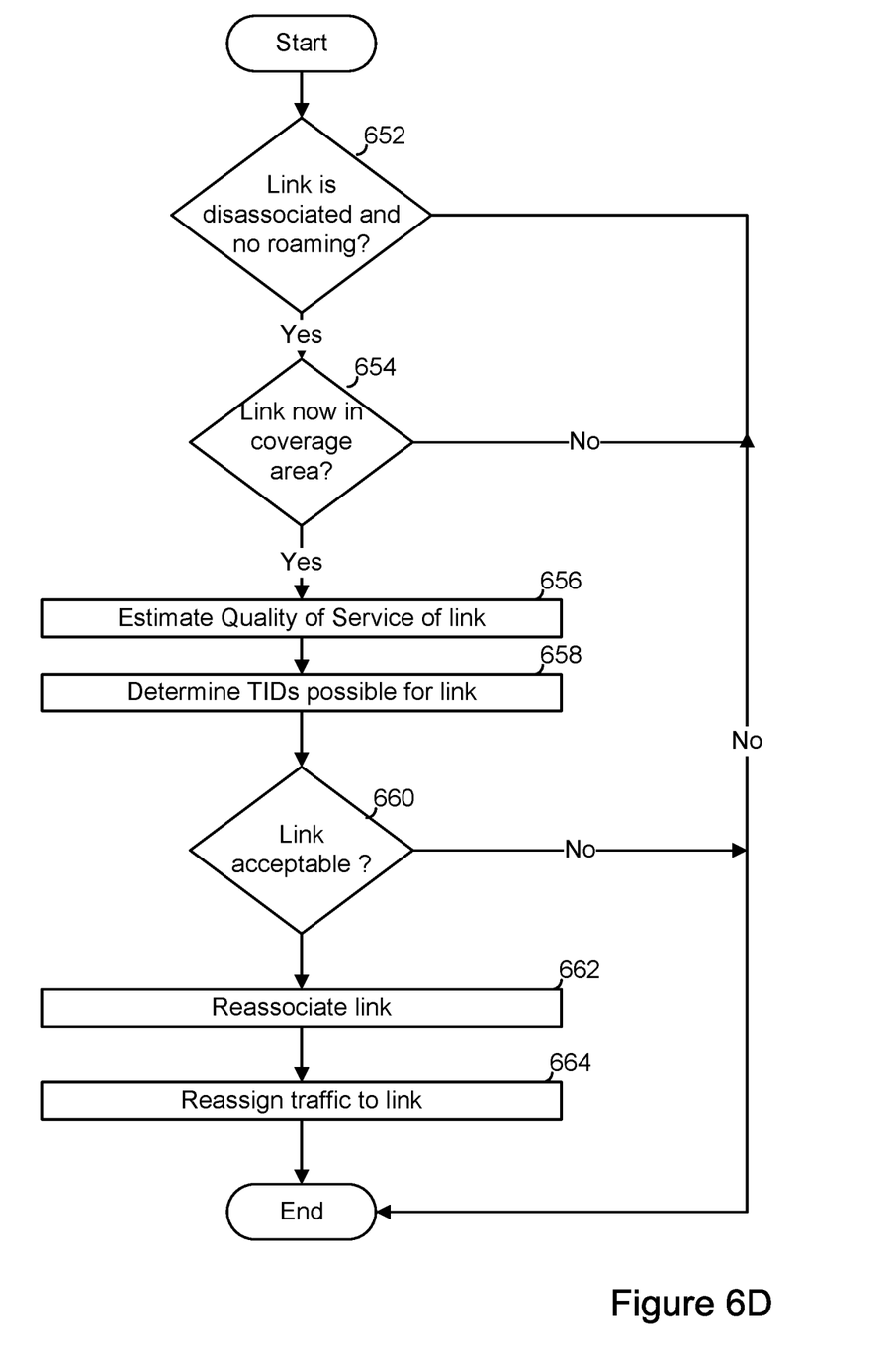

FIG. 6D depicts a flow of operations for a disassociated link moving back to its servicing AP, in an embodiment. In block 652, the MLD AP determines that a link is not currently associated with the MLD AP but that roaming to another MLD AP has not occurred. In block 654, the MLD AP determines that the disassociated link is now in the coverage area of the MLD AP. In block 656, the AP estimates the QoS of the link, and in block 658, determines the possible TIDs for the link. If, as determined in block 660, the link is acceptable, the MLD AP reassociates the link in block 662, and in block 664, the MLD AP reassigns traffic to the link.

Thus, when an MLD STA moves in a way that puts one of its links on the verge of being outside the coverage area, its servicing MLD AP attempts to reroute traffic to other links if a TID-to-link mapping is in place that permits the rerouting. If no such TID-to-link mapping is present, then the MLD AP attempts via request frame 520 to reassign traffic to one of the in-range links if such links have an acceptable quality of service and can handle the link of the STA with the non-viable link. If these attempts fail (e.g., the STA sends a response frame 526 refusing the traffic reassignment in the request frame 520, then the AP causes the MLD STA to roam to a nearby MLD AP. Alternatively, if a disassociated link moves back into range of its previously servicing MLD AP, the MLD AP reassociates the link and assigns traffic to the link.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer-readable medium(s) having computer-readable program code embodied thereon.

Program code embodied on a computer-readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer-readable medium that can direct a computer, other programmable data processing apparatus, or other device to function in a particular manner, such that the instructions stored in the computer-readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer-implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for reducing roaming for multilink devices, the method comprising:
    establishing, using multiple radio links in an access point, multiple radio links with a multilink device;
    determining that one link of the multiple radio links is a non-viable link, the non-viable link being at an edge of a coverage area of, or losing connectivity to, the access point, the non-viable link carrying traffic of a particular type;
    determining whether the traffic of the particular type on the non-viable link is assigned to one other link of the multiple radio links; and
    upon determining that the traffic of the particular type on the non-viable link is, at a first time, assigned to one other link of the multiple radio links and the one other link is in the coverage area, disassociating from the access point the non-viable link of the multilink device.

2. The method of claim 1, further comprising, upon determining that the traffic of the particular type on the non-viable link is, at a second time, not assigned to any other link of the multiple radio links and one other link is in the coverage area:
    determining that the one other link has a suitable quality for handling the traffic of the particular type of the non-viable link;
    reassigning the traffic of the particular type of the non-viable link to the one other link; and disassociating the non-viable link from the access point.

3. The method of claim 2, wherein determining that the one other link has a suitable quality for handling the traffic of the particular type of the non-viable link includes:
   determining a quality of service metric of the one other link; and
   determining particular types of traffic that the one other link can handle.

4. The method of claim 2, further comprising migrating restricted target wake time schedules associated with the non-viable link to the one other link.

5. The method of claim 1, further comprising, determining that the traffic of the particular type on the non-viable link is, at a second time, not assigned to any other link of the multiple radio links and no other link is in the coverage area or no link has a suitable quality:
   requesting that the multilink device roam to another access point; and
   disassociating the non-viable link from the access point.

6. The method of claim 1, further comprising:
   determining that the multilink device with the non-viable link has moved into the coverage area of the access point and the multilink device has not roamed to another access point;
   determining that the non-viable link has a suitable quality to become a viable link;
   reassociating the viable link with the access point; and
   reassigning traffic of a particular type from one other link of the multiple radio links to the viable link.

7. The method of claim 6, wherein determining that the non-viable link has a suitable quality to become a viable link includes:
   estimating a quality of service metric of the viable link; and
   determining particular types of traffic that the viable link is capable of handling.

8. An access point for reducing roaming for multilink devices, the access point comprising:
   multiple radio links;
   a processor; and
   a memory coupled to the processor, wherein the memory has loaded therein an application, which, when executed by the processor, configures the access point to:
      establish, using the multiple radio links in the access point, multiple radio links with a multilink device;
      determine that one link of the multiple radio links is a non-viable link, the non-viable link being at an edge of a coverage area of, or losing connectivity to, the access point, the non-viable link carrying traffic of a particular type;
      determine whether the traffic of the particular type on the non-viable link is assigned to one other link of the multiple radio links; and
      upon determining that the traffic of the particular type on the non-viable link is, at a first time, assigned to one other link of the multiple radio links and the one other link is in the coverage area, disassociate from the access point the non-viable link of the multilink device.

9. The access point of claim 8, wherein the application further configures the access point to, upon determining that the traffic of the particular type on the non-viable link is, at a second time, not assigned to any other link of the multiple radio links and one other link is in the coverage area:
   determine that the one other link has a suitable quality for handling the traffic of the non-viable link;
   reassign traffic of the non-viable link to the one other link; and
   disassociate the non-viable link from the access point.

10. The access point of claim 9, wherein the application configuring the access point to determine that the one other link has a suitable quality for handling the traffic of the particular type of the non-viable link includes configuring the access point to:
   determine a quality of service metric of the one other link; and
   determine particular types of traffic that the one other link can handle traffic of the non-viable link.

11. The access point of claim 9, wherein the application further configures the access point to migrate restricted target wake time schedules associated with the non-viable link to the one other link.

12. The access point of claim 8, wherein the application further configures the access point to, upon determining the traffic of the particular type on the non-viable link is, at a second time, not assigned to any other link of the multiple radio links and no other link is in the coverage area, or no other link has a suitable quality:
   request that the multilink device roam to another access point; and
   disassociate the non-viable link from the access point.

13. The access point of claim 8, wherein the application further configures the access point to:
   determine that the multilink device with the non-viable link has moved into the coverage area of the access point and the multilink device has not roamed to another access point;
   determine that the non-viable link has a suitable quality to become a viable link;
   reassociate the viable link with the access point; and
   reassign traffic of a particular type from one other link of the multiple radio links to the viable link.

14. The access point of claim 13, wherein being configured to determine that the non-viable link has a suitable quality to become a viable link includes being configured to:
   estimate a quality of service of the viable link; and
   determine particular types of traffic that the viable link is capable of handling.

15. A non-transitory computer-readable medium encoding instructions, which, when executed by a processor of an access point coupled to a wireless medium, cause the access point to:
   establish, using multiple radio links in an access point, multiple radio links with a multilink device;
   determine that one link of the multiple radio links is a non-viable link, the non-viable link being at an edge of a coverage area of, or losing connectivity to, the access point, the non-viable link carrying traffic of a particular type;
   determine whether the traffic of the particular type on the non-viable link is assigned to one other link of the multiple radio links; and
   upon determining that the traffic of the particular type on the non-viable link is, at a first time, assigned to one other link of the multiple radio links and the one other link is in the coverage area, disassociate from the access point the non-viable link of the multilink device.

16. The non-transitory computer-readable medium of claim 15, wherein the instructions further cause the access point to, if traffic on the non-viable link is, at a second time, not assigned to any other link of the multiple radio links and one other link is in the coverage area:

determine that the one other link has a suitable quality for handling the traffic of the non-viable link;

reassign traffic of the non-viable link to the one other link; and disassociate the non-viable link from the access point.

17. The non-transitory computer-readable medium of claim 16, wherein the causing the access point to determine that the one other link has a suitable quality for handling the traffic of the non-viable link includes instructions causing the access point to:

determine a quality of service metric of the one other link; and determine particular types of traffic that the one other link can handle.

18. The non-transitory computer-readable medium of claim 15, wherein the instructions further cause the access point to migrate restricted target wake time schedules associated with the non-viable link to the one other link.

19. The non-transitory computer-readable medium of claim 15, wherein the instructions further cause the access point to, upon determining traffic on the non-viable link is, at a second time, not assigned to any other link of the multiple radio links and no other link is in the coverage area or no other link has a suitable quality:

request that the multilink device roam to another access point; and disassociate the non-viable link from the access point.

20. The non-transitory computer-readable medium of claim 15, wherein the instructions further cause the access point to:

determine that the multilink device with the non-viable link has moved into the coverage area of the access point and the multilink device has not roamed to another access point;

determine that the non-viable link has a suitable quality to become a viable link;

reassociate the viable link with the access point; and reassign traffic from one other link of the multiple radio links to the viable link.

* * * * *